US008345852B2

(12) United States Patent
Famous (10) Patent No.: US 8,345,852 B2
(45) Date of Patent: Jan. 1, 2013

(54) SYSTEM TO ESTIMATE BEST TIME TO CONTACT A CONTACT CENTER (75) Inventor: Tod Famous, Ayer, MA (US)

(73) Assignee: Cisco Technology, Inc., San Jose, CA (US)

(*) Notice: Subject to any disclaimer, the term of this patent is extended or adjusted under 35 U.S.C. 154(b) by 702 days.

(21) Appl. No.: 12/251,674

(22) Filed: Oct. 15, 2008

(65) Prior Publication Data
US 2010/0091971 A1 Apr. 15, 2010

(51) Int. Cl.
H04M 3/42 (2006.01)
H04M 3/432 (2006.01)
H04M 3/523 (2006.01)
H04M 3/48 (2006.01)

(52) U.S. Cl. .......... 379/210.01; 379/265.02; 379/266.07

(58) Field of Classification Search ............. 379/209.01, 379/210.01, 265.02, 265.09, 266.01, 266.07, 379/309
See application file for complete search history.

(56) References Cited

U.S. PATENT DOCUMENTS

| 5,155,761 | A | * | 10/1992 | Hammond | 379/88.2 |
|---|---|---|---|---|---|
| 6,820,260 | B1 | * | 11/2004 | Flockhart et al. | 717/173 |
| 6,879,683 | B1 | * | 4/2005 | Fain et al. | 379/265.02 |
| 7,746,999 | B2 | * | 6/2010 | Williams et al. | 379/266.01 |
| 2002/0114432 | A1 | * | 8/2002 | Shaffer et al. | 379/90.01 |
| 2002/0141557 | A1 | * | 10/2002 | Strandberg | 379/210.01 |
| 2006/0167729 | A1 | * | 7/2006 | Rafter et al. | 705/8 |
| 2008/0317058 | A1 | * | 12/2008 | Williams | 370/417 |
| 2009/0285380 | A1 | * | 11/2009 | Chen et al. | 379/210.01 |

* cited by examiner

Primary Examiner — Harry Hong
(74) Attorney, Agent, or Firm — P. Su (57) ABSTRACT In one embodiment, a method includes obtaining a call from a caller, and determining whether to offer a first callback time to the caller. The first callback time is a future time for a contact between the caller and the call center. The method also includes providing the first callback time to the caller, obtaining a response from the caller, and scheduling the contact at the first callback time if the response indicates that the caller desires a contact at the first callback time. Providing the first callback time to the caller includes soliciting the response from the caller which indicates whether the caller desires the contact at the first callback time.

6 Claims, 5 Drawing Sheets

SYSTEM TO ESTIMATE BEST TIME TO CONTACT A CONTACT CENTER

BACKGROUND OF THE INVENTION

The present invention relates generally to networking.

When customers call or otherwise access a call center, they are often confronted with extensive wait times. By way of example, when a customer calls, there may be no available agents of the call center who are able to provide service to the user because all agents are busy and have queues of customers awaiting service. As a result, a call center may allow a user to request a callback from an agent of the call center. When a user requests a callback, an agent will subsequently call the user. A call center may also allow a user to request a specific time for a callback.

BRIEF DESCRIPTION OF THE DRAWINGS

The invention will be readily understood by the following detailed description in conjunction with the accompanying drawings, wherein like reference numerals designate like structural elements, and in which.

DESCRIPTION OF EXAMPLE EMBODIMENTS

General Overview

According to one aspect of the present invention, a method includes obtaining a call from a caller, and determining whether to offer a first callback time to the caller. The first callback time is a future time for a contact between the caller and the call center. The method also includes providing the first callback time to the caller, obtaining a response from the caller, and scheduling the contact at the first callback time if the response indicates that the caller desires a contact at the first callback time. Providing the first callback time to the caller includes soliciting the response from the caller which indicates whether the caller desires the contact at the first callback time.

Description

A call center system may predict when a call volume into the call center system is likely to be relatively low. If a caller calls into a call center at a time when there are essentially no available agents, e.g., when the call volume into the call center is relatively high, the call center may offer the caller a callback at a time when the call volume is relatively low. In other words, a call center may estimate or otherwise identify a time when a call volume is forecasted as likely to be relatively low, and offer the user a callback at such a time.

By suggesting a time for a callback, either proactively if a caller calls a call center when the call center has a relatively high call volume or in response to a caller request for a callback, a call center efficiently utilizes its resources. When a customer callback is scheduled for a time at which the call center anticipates that agents are likely to be available to assist a customer, the call center may operate efficiently, e.g., may make efficient use of its resources.

A call center system may generally use information regarding an anticipated call volume to create a staffing schedule. In general, a staffing schedule may not be directly aligned with an anticipated call volume. That is, despite efforts to the contrary, a staffing schedule will typically includes times at which there is a relatively high staffing-to-call-volume ratio. As such, "troughs" in a staffing schedule, or times at which there is a relatively low call volume relative to a number of agents on duty, are substantially unavoidable. By scheduling callbacks during such troughs or downtimes, the call center may effectively handle additional calls when resources, e.g., agents, are likely to be available while substantially avoiding handling additional calls at times when resources are likely to be scarce.

When a caller calls a call center and acquiesces to or otherwise decides to accept a callback, the call center may run an algorithm to predict when a trough in a staffing schedule is expected, and offer the caller a callback at a time which coincides with the trough. Alternatively, the call center may run such an algorithm periodically such that troughs are not identified substantially in realtime, i.e., in response to a call.

Figure 1:
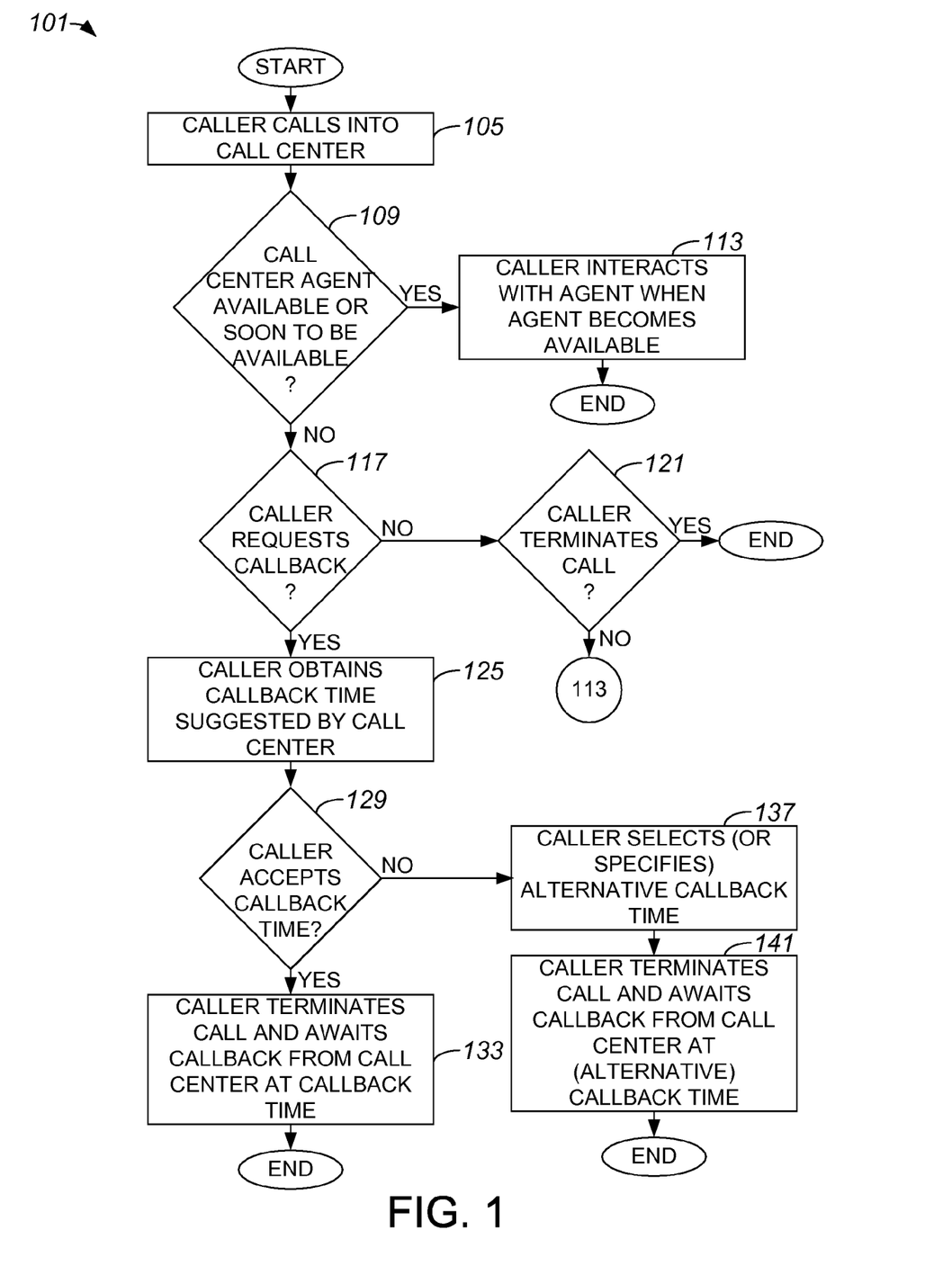
FIG. 1 is a process flow diagram which illustrates a method of interacting with a call center which is capable of offering a callback at times which coincide with a predicted relatively high staffing-to-call-volume ratio in accordance with an embodiment of the present invention.

Referring initially to FIG. 1, a method of a caller interacting with a call center which is capable of offering a callback at times which coincide with a predicted relatively high staffing-to-call-volume ratio will be described in accordance with an embodiment of the present invention. A process 101 of interacting with a call center begins at step 105 in which a caller calls into a call center. Typically, a caller may use a telephone or a computing system to call into or, more generally, to gain access to a call center.

After the caller calls into the call center, a determination is made in step 109 as to whether a call center agent is either currently available or soon to be available. In other words, it is effectively determine whether the caller is likely to be provided with service or assistance in a relatively short amount of time. It should be appreciated that parameters and variables used in a determination of whether a call center agent is soon to be available may vary widely. By way of example, a particular amount of time a caller is expected to wait before a call center agent is likely to be available may be used to determine whether a call center agent is considered as being "soon to be available." A number of callers in queue who are awaiting service from a call center agent may also be used in a determination of whether a call center agent is considered as being "soon to be available."

If it is determined in step 109 that a call center agent is available or soon to be available, the caller interacts with a call center agent in step 113 when an agent becomes available, and the process of interacting with a call center is completed. Alternatively, if the determination in step 109 is that a call center agent is not available and not expected to be available relatively soon, a determination is made in step 117 as to whether the caller has requested a callback from the call center. In the described embodiment, the caller may request a callback upon being informed that a call center agent is unlikely to be available relatively soon. For example, if the call center system informs the caller of his or her anticipated wait time for an available call center agent and the caller finds the wait time to be unacceptable, the caller may request a callback. It should be understood that although the caller may affirmatively request a callback, a call center may instead offer a callback to the caller.

If the caller effectively does not request a callback in step 117, a determination is made in step 121 as to whether the caller has elected to terminate the call. If the determination is that the caller has elected to terminate the call, the process of interacting with a call center is completed. However, if the determination is that the caller has not terminated the call, the indication is that the caller has decided to wait for an available agent. As such, process flow moves from step 121 to step 133 in which the caller interacts with an agent when an agent becomes available.

Returning to step 117, it the caller effectively requests a callback, the caller obtains a callback time suggested by the call center in step 125. The suggested callback time may be a time that is determined by the call center to be a time corresponding to a trough or a downtime for the call center. By way of example, a call center may suggest a callback time that corresponds to a time at which a staffing-to-call-volume ratio is anticipated as being the highest within a particular time frame.

Once the caller obtains a suggested callback time, the caller may either accept or reject the suggested callback time. A determination is made in step 129 whether the caller has accepted the suggested callback time. If it is determined that the caller has accepted the suggested callback time, the caller terminates the call and awaits a callback from the call center at the suggested callback time in step 133. Upon the termination of the call, the process of interacting with a call center is completed.

Alternatively, if it is determined in step 129 that the caller has not accepted the callback time, the caller may select an alternative callback time in step 137. Selecting the alternative callback time may include selecting a different time that is suggested by the call center, e.g., a time that a staffing-to-call-volume is expected to be relatively high but not as high as the originally suggested time, and/or specifying a time that the caller considers to be convenient.

After the caller selects an alternative callback time, the caller terminates the call in step 141 and awaits a callback from the call center at the alternative callback time. Once the caller terminates the call, the process of interacting with a call center is completed.

Figure 2:
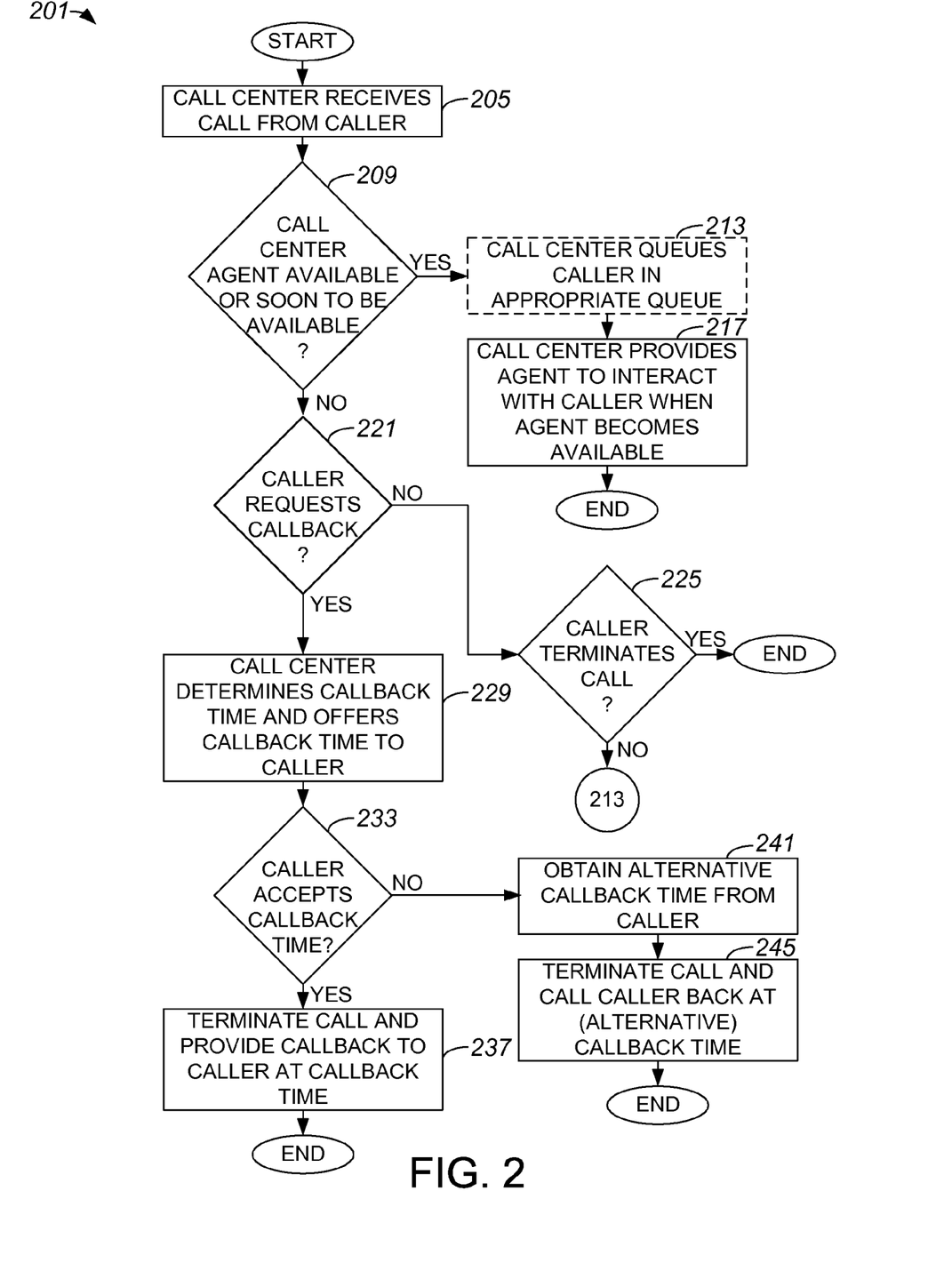
FIG. 2 is a process flow diagram which illustrates a method of processing a call received by a call center in accordance with an embodiment of the present invention.

FIG. 2 is a process flow diagram which illustrates a method of processing a call received by a call center from the point-of-view of the call center in accordance with an embodiment of the present invention. A method 201 of processing a call received by a call center begins at step 205 in which a call center receives a call from a caller. Upon receiving the call, the call center ascertains whether a call center agent is available or likely to be available relatively soon in step 209. Such a determination may include, but is not limited to including, determining how many callers are currently being serviced by call center agents and how many callers are queued or currently awaiting service. Substantially any criterion may be used to determine whether a call center agent is likely to be available relatively soon, or whether there is a relatively high probability that the caller will be served relatively soon. By way of example, a call center may set a particular queue length or number of callers awaiting service as being indicative of whether a call center agent is likely to be available soon.

If it is determined in step 209 that a call center agent is either available or soon to be available, then the call center optionally queues the caller into an appropriate queue in step 213. An appropriate queue may be an overall queue associated with the call center, or may be a queue associated with a specific agent or group of agents. It should be appreciated that queuing a caller is optional because if an agent is currently available, the queuing of the call may be substantially avoided. After the call center queues the caller in an appropriate queue, the call center provides an agent to interact with the caller when the agent becomes available in step 217. The processing of a call received by the call center is completed once the call center provides an agent to interact with the caller.

On the other hand, if it is determined that a call center agent is not current available and is not expected to available soon, process flow moves to step 221 in which it is determined whether the caller has requested a callback. If it is determined that the caller has not requested a callback, then it is determined in step 225 whether the caller has terminated the call. If the caller has terminated the call, the processing of a call received by the call center is completed. Alternatively, if it is determined in step 225 that the caller has not terminated the call, process flow returns to step 213 in which the call center queues the caller in an appropriate queue.

Returning to step 221, if the determination is that the caller has requested a callback, the call center determines a callback time and offers, or suggests, the callback time to the caller in step 229. One method of determining a callback time and offering the callback time to the caller will be discussed below with reference to FIG. 3.

In step 233, it is determined whether the caller has accepted the callback time offered by the call center. If it is determined that the caller has accepted the callback time, then the call is terminated in step 237, and the call center provides a callback to the caller at the callback time. It should be appreciated that to be able to provide the callback at the callback time, the call center may schedule the callback. The processing of a call received by the call center is completed once the call is terminated.

Alternatively, if it is determined in step 233 that the caller has not accepted the callback time offered by the call center, then an alternative callback time is obtained from the caller in step 241. Obtaining an alternative callback time from the caller may include allowing the caller to specify a particular callback time or offering another callback time to the caller. In one embodiment, if the call center offers another callback time to the caller, the call center may search for other times at which a staffing-to-call-volume ration is relatively high.

Once an alternative callback time is obtained from the caller, the call is terminated in step 245, and the call center calls the caller back at the alternative callback time. The processing of a call received by the call center is completed once the call is terminated.

Figure 3:
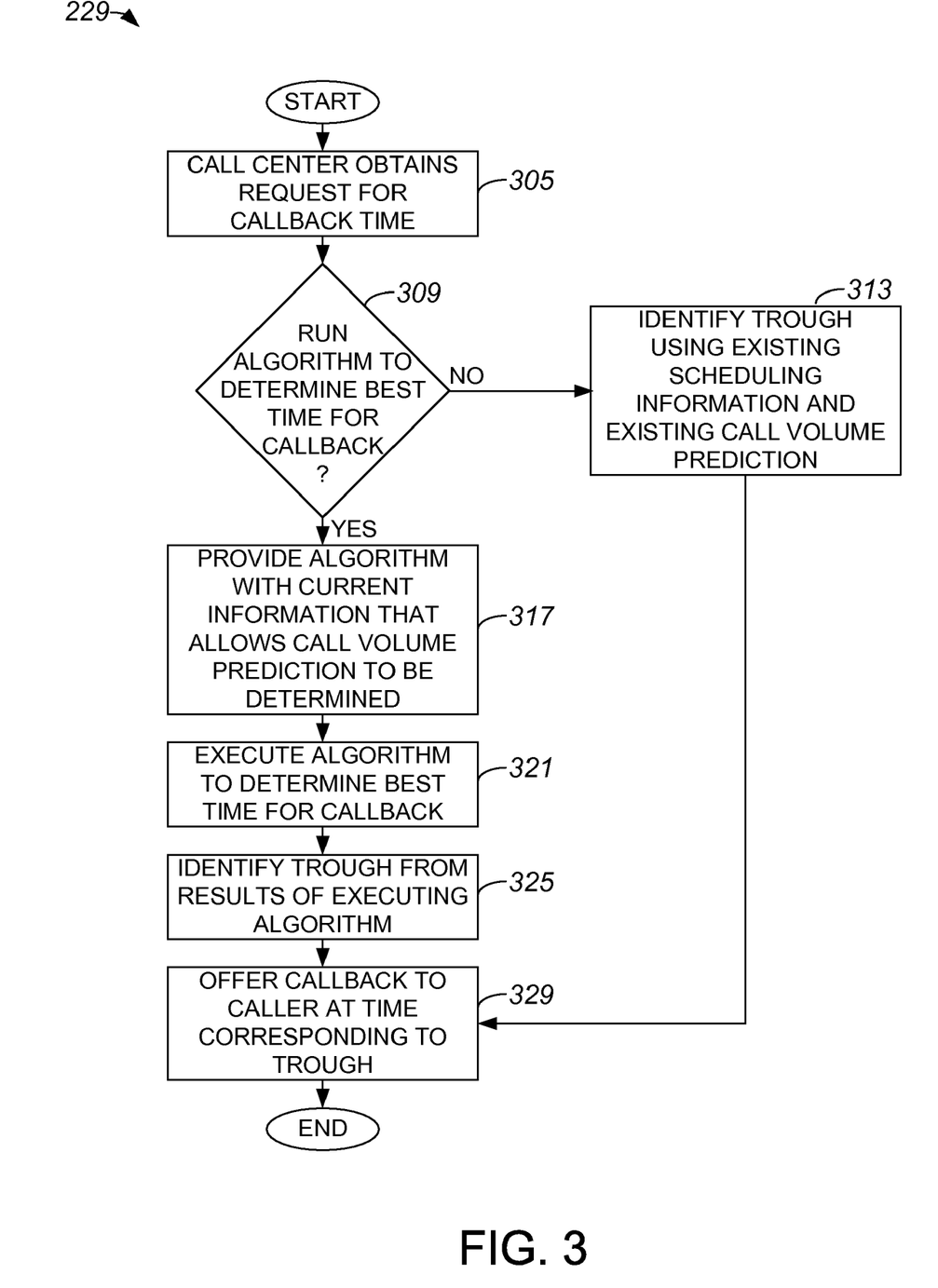
FIG. 3 is a process flow diagram which illustrates a method of establishing a callback time, e.g., step 229 of FIG. 2, in accordance with an embodiment of the present invention.

With reference to FIG. 3, one method associated with a call center determining a callback time and offering the callback time to a caller, e.g., step 229 of FIG. 2, will be described in accordance with an embodiment of the present invention. A process of determining a callback time and offering the callback time to a caller begins at step 305 in which the call center obtains a request for a callback time, or otherwise determines that a caller desires a callback time. Once the call center obtains the request for a callback time, a determination is made in step 309 as to whether an algorithm configured to determine a substantially best time for a callback is to be run. Such an algorithm is generally arranged to determine a substantially best time for a callback substantially in real time, e.g., as needed when there is a current request for a callback time. The algorithm, which may be associated with workforce management software that provides agent staffing schedules based on predicted call volumes, may use any suitable formulas to effectively perform staffing optimizations and to determine the substantially best time to schedule a callback. Suitable formulas may include, but are not limited to including, Erlang-C formulas and the like.

If the determination in step 309 is that an algorithm to estimate a best time for a callback is to be run, current information is provided to the algorithm in step 317. The current information generally allows a call volume prediction to be determined, and may include current agent staffing information, information relating to current calls in a queue, an average handling time over a recent time period, and a call volume over a recent time period. As will be appreciated by those skilled in the art, an average length of a call (AHT) may be computed over a time period such as the last half hour, the last hour, time since a shift started, etc. Work flow management systems may user the current information to generate schedules. Such current information may be a better indication of what is actually happening currently than information entered into a work flow management system as predictive information entered earlier. For example, a schedule may have asked for thirty agents to work today, but there may be a snow storm and only five agents are actually working. A work flow management system would predict a trough when in fact none will occur. Similarly, a flight reservation call center in a weather situation may have to rebook many flights, so the average handle time may increase drastically do to the complex nature of rebooking calls. As such, the AHT over the past hour may be much different then what was assumed in a work flow management schedule. Hence, it might be prudent to consider such a situation when choosing a callback time. In general, a work flow management system may have an estimate, but it may be beneficial to check the estimate against a real time system for certain situations.

From step 317, process flow moves to step 321 in which the algorithm is executed such the substantially best time for a callback is estimated. The algorithm may base such a determination on an existing agent staffing schedule and a current call volume forecast. Executing the algorithm may result in a representation of a staffing-to-call-volume ratio over time. After the algorithm is executed, a trough may be identified in the results obtained through executing the algorithm in step 325. By way of example, the highest staffing-to-call-volume ratio during a particular time period may be identified as the best time for a callback. It should be appreciated, however, that the trough is not limited to being the highest staffing-to-call-volume ratio during a particular time period.

Once a trough is identified, the caller is offered a callback scheduled at a time corresponding to the trough in step 329. For example, the caller may be offered a callback at a time at which the staffing-to-call-volume ratio is at its highest within a particular time period. The process of determining a callback time and offering the callback time to a caller is the completed.

Returning to step 309, if the determination in step 309 is that no algorithm to determine the substantially best time for a callback is to be run, the indication may be that a call center utilizes existing scheduling information and existing call volume prediction information to determine a substantially best time for a callback. That is, the implication may be that a call center may use previously determined information to identify the substantially best time for a callback. By way of example, a call center may utilize information that is determined periodically. As such, in step 313, a trough is identified using existing scheduling information, i.e., existing staff or agent scheduling information, and an existing call volume prediction. Then, process flow moves to step 329 in which the call center offers a callback to a caller at a time corresponding to the trough.

Figure 4:
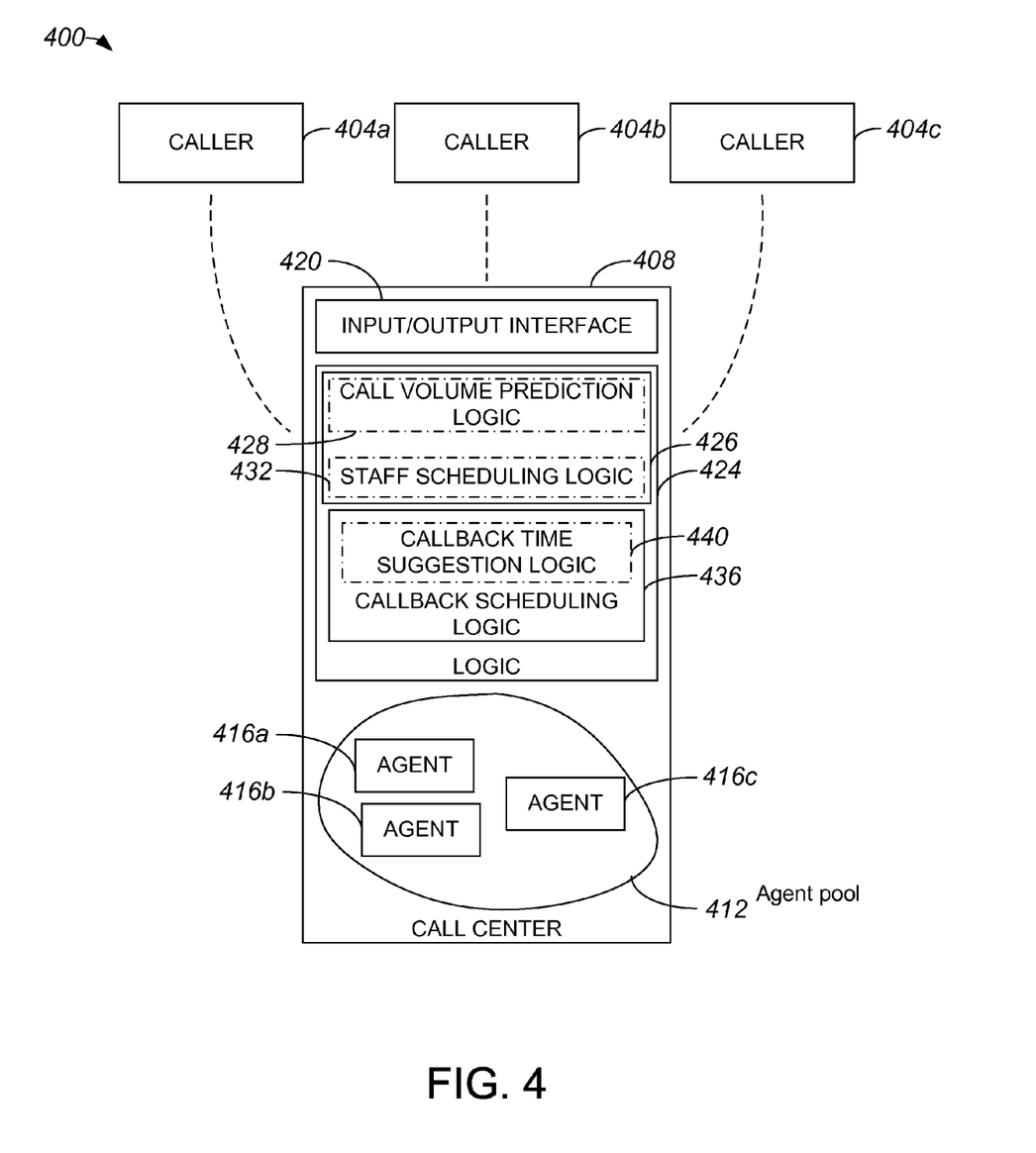
FIG. 4 is a diagrammatic representation of a call center system in accordance with an embodiment of the present invention.

In general, a call center which is capable of estimating a best time for a callback is part of an overall call center system or network that a plurality of callers. FIG. 4 is a diagrammatic representation of a call center system in accordance with an embodiment of the present invention. A call center system 400 includes a plurality of callers 404a-c and a call center 408. Callers 404a-c may communicate with call center 408 through any suitable communications medium, e.g., a wireless communications link or a wired communications link. Typically, callers 404a-c utilize devices such as landline telephones, mobile telephones, and computing systems to communicate with call center 408.

Call center 408 includes an input/output interface 420 that allows call center 408 to receive calls from and to initiate calls to callers 404a-c. Call center 408 also includes a pool 412 of agents 416a-c that are arranged to interact with callers 404a-c to provide service or assistance.

Logic 424 is arranged to provide functionality associated with call center 408. In general, logic 424 allows calls received from callers 404a-c to be queued and routed to agents 416a-c in pool 412. Logic 424 also includes call volume prediction logic 428 and staff scheduling logic 432. In one embodiment, call volume prediction logic 428 and staff scheduling logic 432 may be associated with overall workforce management logic 426. Call volume prediction logic 428 is generally arranged to predict or to estimate a call volume that is likely at a future time based on information that is available, e.g., based on historical call volume information. Staff scheduling logic 432 is generally arranged to apply formulas or algorithms, as for example Erlang-C formulas, that substantially optimize the scheduling of agents 416a-c in pool 412 based on call volume estimated by call volume prediction logic 428.

Logic 424 also includes callback scheduling logic 436 which uses callback time suggestion logic 440 to estimate a substantially best time for an agent 416a-c to call back a caller 404a-c, e.g., to schedule a callback with a caller 404a-c. Callback time suggestion logic 440 may access results generated by workforce management logic 426 to determine staffing-to-call-volume ratios, and to identify times at which the staffing-to-call-volume ratios are relatively high. As previously mentioned, times at which the staffing-to-call-volume ratios are relatively high typically correspond to troughs in the call volume handled by agents 416a-c, or downtimes for agents 416a-c.

Figure 5:
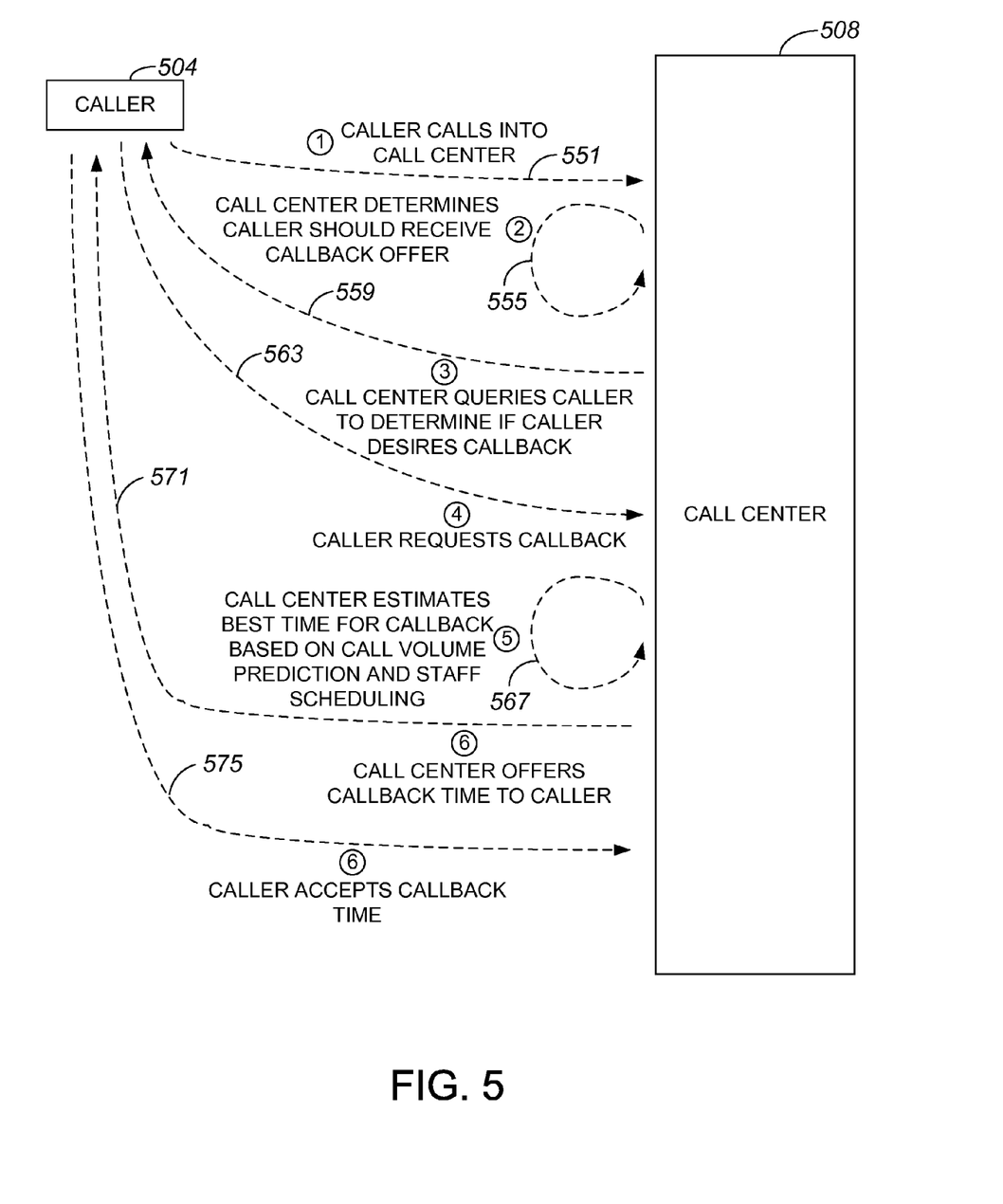
FIG. 5 is a diagrammatic representation of a flow of communications between a caller and a call center during which a caller is offered a callback time in accordance with an embodiment of the present invention.

FIG. 5 is a diagrammatic representation of a flow of communications between a caller and a call center during which a caller is offered a callback time in accordance with an embodiment of the present invention. Communications between a caller 504 and a call center 508 are generally initiated when caller 504 calls into call center 508 in a first step 551 of a process. Upon receiving a call, call center 508 determines whether caller 504 should receive a callback offer in step 555. For ease of discussion, it is assumed that call center 508 determines that caller 504 should receive a callback offer, e.g., because there are no agents (not shown) who are either currently available or expected to become available within a predetermined amount of time.

Call center 508, in a step 559, queries caller 504 to determine if caller 504 desires a callback. In the described embodiment, caller 504 desires a callback. Hence, in step 563, caller 504 requests a callback. When call center 508 receives or otherwise obtains a request for a callback, call center 508 estimates a best time for a callback in step 567 based on call volume prediction and staff scheduling.

Once call center 508 estimates a best time for a callback, call center 508 offers that callback time to caller 504 in step 571. In step 575, caller 504 accepts the offered callback time. Although caller 504 is described as accepting the offered callback time, it should be appreciated that caller 504 may instead reject the offered callback time. If caller 504 rejects the offered callback time, caller 504 typically notifies call center 508 of the rejection, and call center 508 may then offer another callback time to caller 504 and continue to offer callback times until caller 504 accepts a callback time.

Although only a few embodiments of the present invention have been described, it should be understood that the present invention may be embodied in many other specific forms without departing from the spirit or the scope of the present invention. By way of example, there may be more than one estimated best time for a callback. If there is more than one estimated best time for a callback, or if there are two or more times that have substantially the same associated staffing-to-call-volume ratio, a call center may suggest the time that is most proximate to when a caller called.

In one embodiment, a call center may substantially limit a time period during which a time for a callback may be estimated. That is, a time period over which a search is effectively made for a callback time may be limited. For instance, when a call center is in the process of estimating a best time to schedule a callback to a caller, the call center may estimate the best time within a particular time frame. The length of the particular time frame may vary widely based on a number of factors including, but not limited to including, the requirements of a particular call center system or the preferences of a caller. The particular time frame may be within an hour from the caller's call, within a number of hours from the caller's call, or within a day of the caller's call.

Interactions which occur between a caller and a call center may be facilitated by any suitable user interface. Suitable user interfaces may include, but are not limited to including, graphical user interfaces, user interfaces which are menu driven and include voice recognition capabilities, and/or user interfaces which are menu driven and accept inputs provided through keypads associated with a telephone.

In one embodiment, a call center may solicit information from a caller before suggesting a callback time. For example, a call center may obtain a window of time during which a caller may prefer a callback, and then find a time at which the ratio of staffing-to-call-volume is predicted to be the lowest within that window.

If a call center offers to schedule a callback that is to occur at a time at which a relatively high staffing-to-call-volume ratio is predicted or otherwise anticipated, the caller may reject that time. As previously discussed, upon receiving an indication that the caller has not accepted the suggested callback time, the call center may offer another callback time, e.g., another time at which there is a relatively high staffing-to-call-volume ratio. Offers may generally continue to be made until the caller accepts a time. In one embodiment, however, if a caller effectively rejects the first callback time suggested, the caller may be allowed to specify a particular time at which he or she would prefer a callback.

While a callback time has generally been described as being a time at which a call center may call, e.g., place a telephone call to, a caller. It should be understood, however, that in lieu of calling a call center at the callback time, a call center may instead contact the caller using other suitable methods. By way of example, at a callback time, a call center may initiate an instant messaging chat with the caller or initiate text messaging with the caller. In other words, a callback is not limited to being associated with a telephone call, and may instead be associated with other types of contact or communications.

A determination of whether a caller is likely to be served by a call center agent relatively soon may include assessing a probability of the caller being served within a particular amount of time. A threshold probability, or expectation, of the caller being served within a particular amount of time may vary widely.

The present invention may be implemented as hardware and/or software logic embodied in a tangible medium that, when executed, is operable to perform the various methods and processes described above. For example, the logic that enables a system to determine a call center forecast and to use the forecast to offer a caller a time for a scheduled callback may be implemented as hardware logic, software logic, or a combination of both hardware and software logic.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method comprising:
   obtaining a call on an input/output interface of a call center from a caller;
   determining whether to offer a first callback time to the caller, the first callback time being a future time for a contact between the caller and a call center, wherein determining whether to offer the first callback time to the caller includes determining if the call is expected to be serviced by the call center within a particular period of time;
   identifying the first callback time if it is determined that the call is not expected to be serviced by the call center within the particular period of time, wherein the future time is a time at which the call center is predicted to be able to service the call center, and wherein identifying the first callback time includes identifying a first time period and identifying a first time during the first time period at which a ratio of a number of agents to an expected call volume handled by the call center is relatively high, the agents being associated with the call center;
   providing the first callback time to the caller, wherein providing the first callback time to the caller includes soliciting a response from the caller which indicates whether the caller desires the contact at the first callback time;
   obtaining the response from the caller; and
   scheduling the contact at the first callback time if the response indicates that the caller desires a contact at the first callback time.

2. The method of claim 1 wherein the ratio of the number of agents to the expected call volume is highest at approximately the first time and the first callback time corresponds to the first time.

3. A method comprising:
   obtaining a call on an input/output interface of a call center from a caller;
   determining whether to offer a first callback time to the caller, the first callback time being a future time for a contact between the caller and a call center, wherein determining whether to offer the first callback time to the caller includes determining if the call is expected to be serviced by the call center within a particular period of time;

identifying the first callback time if it is determined that the call is not expected to be serviced by the call center within the particular period of time, wherein the future time is a time at which the call center is predicted to be able to service the call center;

providing the first callback time to the caller, wherein providing the first callback time to the caller includes soliciting a response from the caller which indicates whether the caller desires the contact at the first callback time;

obtaining the response from the caller;

scheduling the contact at the first callback time if the response indicates that the caller desires a contact at the first callback time, wherein if the response indicates that the caller does not desire the contact at the first callback time, the method further includes identifying a second callback time, wherein a ratio of a number of agents to an expected call volume handled by the call center is higher at the first callback time than at the second callback time, the agents being associated with the call center, providing the second callback time to the caller, wherein providing the second callback time to the caller includes soliciting a second response from the caller which indicates whether the caller desires a contact at the second callback time, obtaining the second response from the caller, and scheduling the contact at the second callback time if the second response indicates that the caller desires a contact at the second callback time.

4. Logic encoded in one or more non-transitory tangible media for execution and when executed operable to:

obtain a call from a caller;

determine whether to offer a first callback time to the caller, the first callback time being a future time for a contact between the caller and a call center, wherein the logic operable to determine whether to offer the first callback time to the caller is further operable to determine if the call is expected to be serviced by the call center within a particular period of time;

identify the first callback time if it is determined that the call is not expected to be serviced by the call center within the particular period of time, wherein the future time is a time at which the call center is predicted to be able to service the call center, and wherein the logic operable to identify the first callback time is further operable to identify a first time period and to identify a first time during the first time period at which a ratio of a number of agents to an expected call volume handled by the call center is relatively high, the agents being associated with the call center;

provide the first callback time to the caller, wherein the logic operable to provide the first callback time to the caller is further operable to solicit a response from the caller which indicates whether the caller desires the contact at the first callback time;

obtain the response from the caller; and schedule the contact at the first callback time if the response indicates that the caller desires a contact at the first callback time.

5. The logic of claim 4 wherein the ratio of the number of agents to the expected call volume is highest at approximately the first time and the first callback time corresponds to the first time.

6. Logic encoded in one or more non-transitory tangible media for execution and when executed operable to:

obtain a call on an input/output interface of a call center from a caller;

determine whether to offer a first callback time to the caller, the first callback time being a future time for a contact between the caller and a call center, wherein the logic operable to determine whether to offer the first callback time to the caller is further operable to determine if the call is expected to be serviced by the call center within a particular period of time;

identify the first callback time if it is determined that the call is not expected to be serviced by the call center within the particular period of time, wherein the future time is a time at which the call center is predicted to be able to service the call center;

provide the first callback time to the caller, wherein the logic operable to provide the first callback time to the caller is further operable to solicit a response from the caller which indicates whether the caller desires the contact at the first callback time;

obtain the response from the caller;

schedule the contact at the first callback time if the response indicates that the caller desires a contact at the first callback time, wherein if the response indicates that the caller does not desire the contact at the first callback time, the logic is further operable to identify a second callback time, wherein a ratio of a number of agents to an expected call volume handled by the call center is higher at the first callback time than at the second callback time, the agents being associated with the call center, provide the second callback time to the caller, wherein the logic operable to provide the second callback time to the caller is further operable to solicit a second response from the caller which indicates whether the caller desires a contact at the second callback time, obtain the second response from the caller, and schedule the contact at the second callback time if the second response indicates that the caller desires a contact at the second callback time.

* * * * *